United States Patent [19]

Tamura et al.

[11] 4,413,798
[45] Nov. 8, 1983

[54] AUTOMOTIVE VEHICLE PARTS AND FITTING STRUCTURE THEREFOR

[75] Inventors: Takeo Tamura, Yokohama; Mamoru Imai, Fujisawa, both of Japan

[73] Assignee: Nissan Motor Company Limited, Yokohama, Japan

[21] Appl. No.: 329,876

[22] Filed: Dec. 11, 1981

[30] Foreign Application Priority Data

Dec. 18, 1980 [JP] Japan .................. 55-182326[U]

[51] Int. Cl.³ .............................................. G12B 9/00
[52] U.S. Cl. ............................. 248/27.1; 248/DIG. 6
[58] Field of Search ............. 248/27.1, 27.3, DIG. 6; 180/90; 200/168 C, 168 D, 296; 174/50, 58; 339/126 R, 132 R, 128

[56] References Cited

U.S. PATENT DOCUMENTS

| | | | |
|---|---|---|---|
| 2,664,132 | 12/1953 | Leverte | 339/132 R X |
| 3,164,870 | 1/1965 | Harms . | |
| 3,457,396 | 7/1969 | Mrsny . | |
| 3,544,952 | 12/1970 | Piaget | 339/126 R X |
| 3,659,037 | 4/1972 | MacDonald | 248/DIG. 6 X |
| 4,044,980 | 8/1977 | Cummins | 248/459 X |
| 4,214,668 | 7/1980 | Neff | 248/DIG. 6 X |
| 4,235,502 | 11/1980 | Marks | 248/DIG. 6 X |

FOREIGN PATENT DOCUMENTS 551813  1/1958  Canada .................. 174/58

OTHER PUBLICATIONS

Weekstatt-Handbuch VW (Vorkswagen Workshop Handbook) Mar. 1971.

*Primary Examiner*—J. Franklin Foss
*Attorney, Agent, or Firm*—Lane, Aitken & Kananen

[57] ABSTRACT

An automotive vehicle part and fitting structure therefore includes a cover for covering a fastener such as screw so that the sharp end of the fastener does not damage the lining or insulation of electric wiring of the vehicle. The cover is rotatably attached to the vehicle parts and is movable during installation of the part onto the vehicle panel in order to permit the part to be attached to the vehicle panel. The cover mainly comprises two plain sections connected with each other at a right angle, one of which is positioned over the top of fastener to serve as a cover and the other of which engages part of the vehicle panel so as to hold the cover in position covering the end of the fastener.

12 Claims, 10 Figs.

AUTOMOTIVE VEHICLE PARTS AND FITTING STRUCTURE THEREFOR

BACKGROUND OF THE INVENTION

The present invention relates generally to an improvement for and is related to an automotive vehicle part and fitting structure therefor. More particularly, the invention relates to resin vehicle parts to be fitted onto a vehicle panel, which parts have means for preventing direct contact between the fastener for attaching the part and a relatively soft layer such as lining or insulation of electric wiring.

A vehicle part having a container portion is installed onto a vehicle panel, comprising part of the vehicle body, for mounting vehicle equipment, such as, a room lamp, a foot lamp, circuits for lighting switches and so on. The vehicle part is generally secured to the vehicle panel with screws and covered by lining or other relatively soft layers. Conventionally, such lining or layer is apt to be damaged by the sharp end of the screws or scratched by the threads. Further, it is possible that the screw will cut the insulation of electric wiring to cause shorting which may cause a fire within the vehicle.

The invention is to prevent the lining layer, or insulation, from being damaged or scratched by the screws by covering the screws. The invention is also intended to provide a simple construction and installation of a vehicle part which effectively protects the lining layer from being injured or scratched by the screws.

SUMMARY OF THE INVENTION

Therefore, it is an principle object of the present invention to provide an automotive vehicle part having means for covering the end of a fastener used for fixing the vehicle part to a vehicle panel.

Another principle object of the invention is to provide a structure for fixing the vehicle part of the invention onto the vehicle panel, in which a lining layer, insulation, and so forth, are effectively protected from being damaged or scratched by the fastener for fixing the vehicle part to the vehicle panel.

To accomplish the above-mentioned and other objects, a vehicle part, according to the present invention, is provided with extensions which are adapted to cover the screws. Preferably the extension is attached to the vehicle part via a suitably flexible member so that the extension will not interfere with installation of the vehicle part into the vehicle panel, but will automatically be positioned to cover the end of the fastener.

According to one embodiment of the present invention, an automotive vehicle part to be installed onto a vehicle panel for mounting vehicle equipment such as a room lamp, comprises a substantially box-shaped container in the form of an open-ended chamber for receiving the vehicle equipment; a flange extending laterally from the periphery of the container and having an opening for receiving a fastener for fixing the flange onto the vehicle panel, the flange constituting a part body in conjunction with the container; and a fastener cover opposite the fastener for covering at least the sharp end of the fastener, which fastener cover includes a flexible hinge allowing the fastener cover to move so that the fastener cover will not interfere with installation of the part onto the vehicle panel.

Further, according to the present invention, there is provided a mounting structure for fixing the vehicle part of the invention to the vehicle panel without causing any additional assembly steps in comparison with that of conventional mounting procedures.

To achieve this, the structure comprises a vehicle panel having an opening which includes a vertically raised edge portion, a vehicle part including a substantially box-shaped container, a flange extending from the periphery of the container parallel to the vehicle panel, which flange has a hole for a fastener by which the vehicle part is fixed to the vehicle panel, and a fastener cover having first and second plain sections connected to each other at a right angle and a pivot provided at the connecting portion of the first and second sections so as to permit the first and second sections to rotate about the pivot axis, the second section being adapted to engage with the vertically raised edge of the opening of the vehicle panel when the vehicle part is fixed to the vehicle panel and the first section being adapted to extend over the fastener to cover the latter when the vehicle part is fixed to the vehicle panel.

BRIEF DESCRIPTION OF THE DRAWINGS

The present invention will be more fully understood from the detailed description given herebelow and from the accompanying drawings which, however, should not be taken as limitative to the invention but for explanation or elucidation only.

In the drawings.

DESCRIPTION OF THE PREFERRED EMBODIMENT

Figure 1:
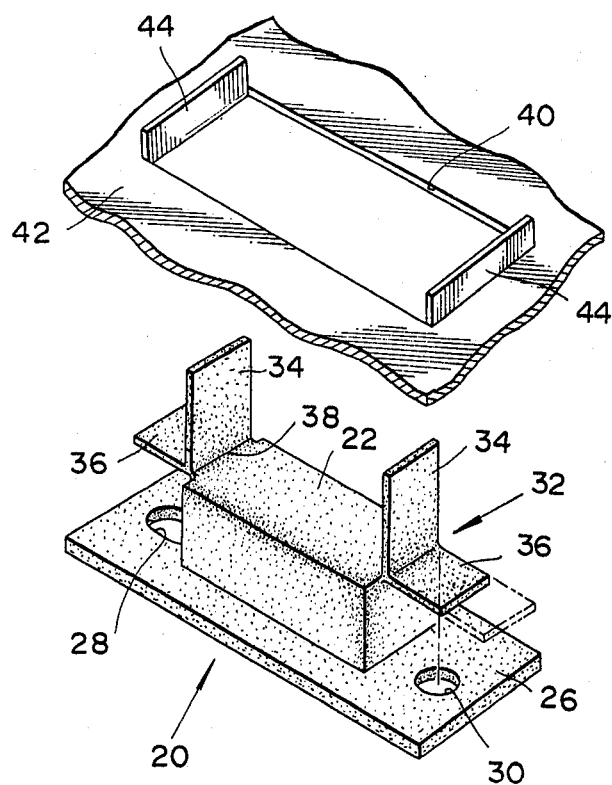
FIG. 1 is an exploded perspective view of an automotive vehicle part of the first embodiment and an automotive vehicle panel.

Referring now to the drawings, particularly to FIGS. 1 to 5, there is illustrated the first embodiment of an automotive vehicle part 20 according to the present invention. The part 20 is made of a flexible synthetic resin, such as, for example, polypropylene, nylon, and the like. The part 20 defines a rectangular box-shaped container 22 with one open face 24. At the open face of the container 22, a flange 26 extends laterally from the periphery of the container. The flange 26 is formed with an elongated opening 28 and a circular opening 30 located on opposite sides with respect to the container 22. A pair of substantially L-shaped extensions 32 having first and second sections 34 and 36 are provided at the bottom edges of the container extending outwardly. A flexible a hinge portion 38 is provided between the bottom edge of the container and the extensions 32 so as to permit the extension to rotate about hinge axis thereof. The second section 36 of the extension 32 is shorter than the distance between the hinge 38 and the flange 26.

Figure 2:
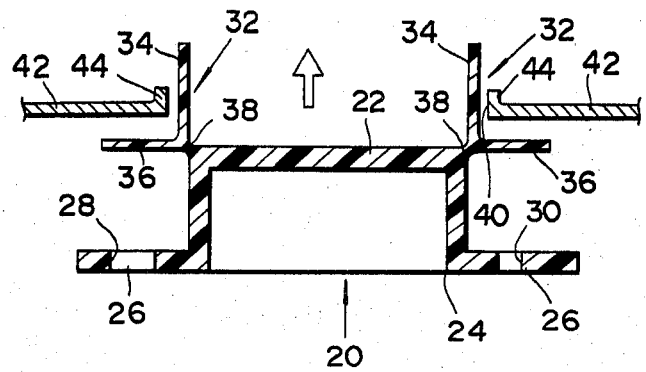
FIG. 2 is a transverse section of the vehicle part and the vehicle panel of FIG. 1 in a disassembled condition.
Figure 3:
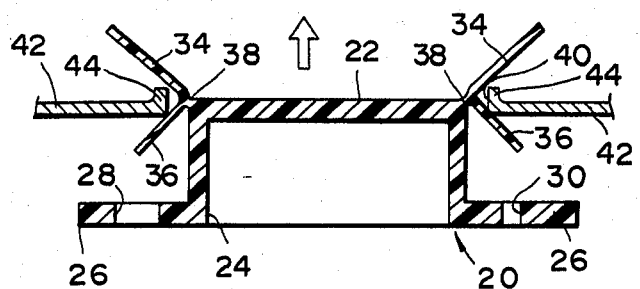
FIGS. 3 and 4 are views similar to FIG. 2 and respectively showing different stages of the installation of the vehicle part to the vehicle panel.
Figure 4:
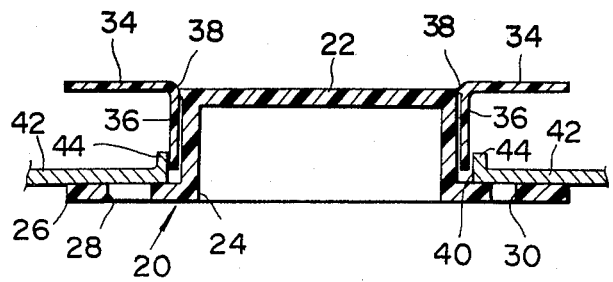
Figure 5:
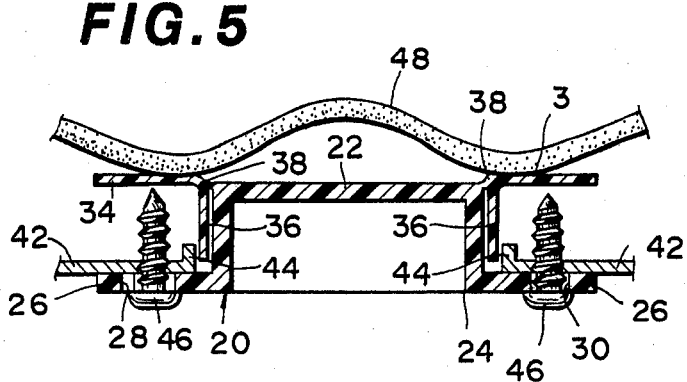
FIG. 5 is a view similar to FIG. 2 of the final assembled condition of the vehicle part and vehicle panel.

The container 22 is adapted to receive various vehicle equipment or electrical components (not shown) to be installed in the vehicle compartment. The container 22 is received in a rectangular opening 40 formed in a vehicle panel 42. The panel 42 is provided with vertically extending tongues 44 on the opposing edges of the opening 40. As shown in FIG. 2, the extension 32 is initially positioned with the first section 34 perpendicular to the bottom surface of the container 22. As the container 22 passes through the opening 40 of the panel 42, the edges of the opening 40 contact the second sections 36 to cause the latter to rotate about the hinge portion 38, as shown in FIGS. 3 and 4. The flange 26 finally abuts the panel 42, as shown in FIG. 5. In this position, the tongue 44 contacts the free end of the second section 36 to prevent the extension from returning to the initial position. In this position, screws 46 pass through the elongated opening 28 and the circular opening 30 and engage with the panel 42. Thus, the part 20 is secured to the inner panel 42.

As is apparent from FIG. 5, the first section 34 of the extension 32 covers the relatively sharp top of the screw 46. This prevents a head liner or harness 48 stretched along the inner surface of the panel 42 from being damaged.

Figure 6:
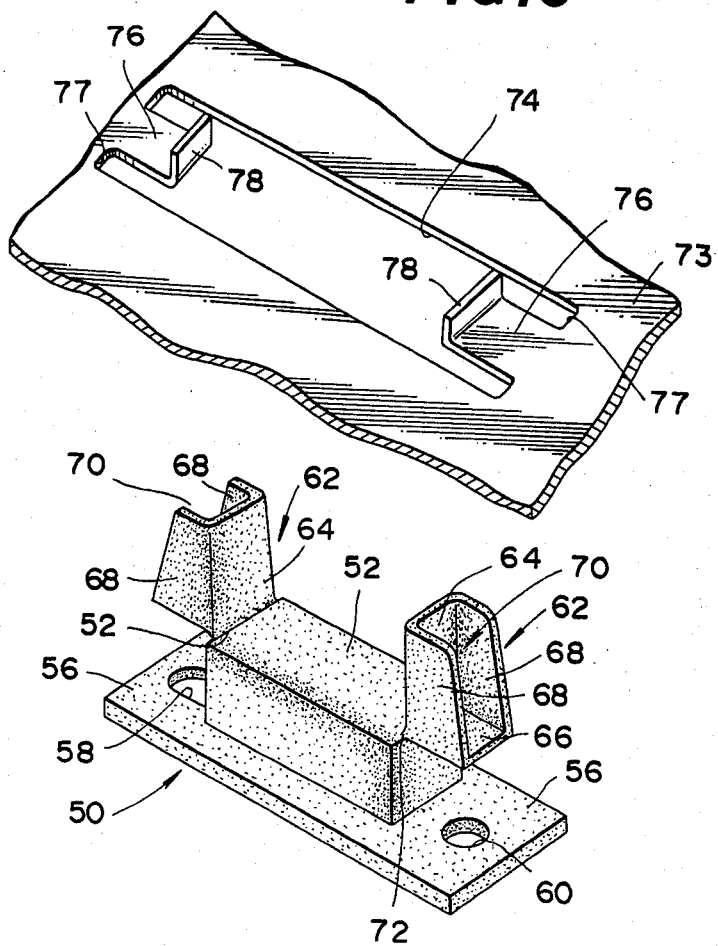
FIG. 6 is perspective view similar to FIG. 1 but showing a second embodiment of the vehicle part and vehicle panel for receiving the vehicle part.
Figure 7:
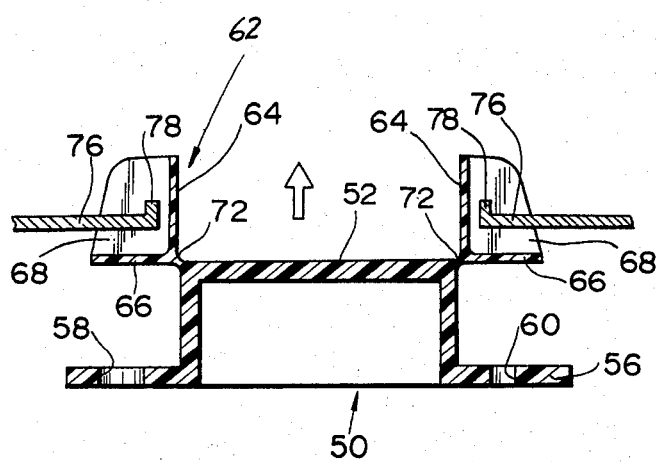
FIG. 7 is a transverse section of the vehicle part and the vehicle panel of FIG. 6 in the disassembled condition.
Figure 8:
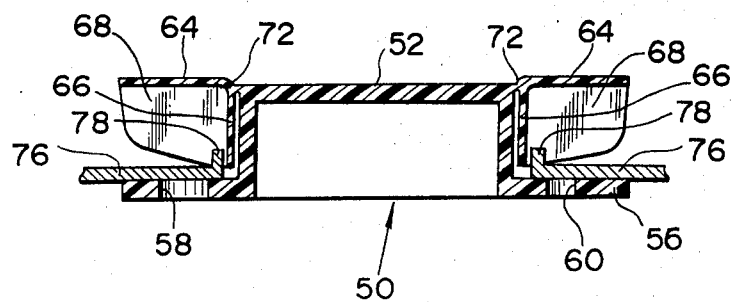
FIG. 8 is section similar to FIG. 7 of the assembled condition of the vehicle part and the vehicle panel.

FIGS. 6 to 8 illustrate the second embodiment of the vehicle part of the invention. Similar to the foregoing first embodiment, the part 50 defines a substantially rectangular box-shaped container 52 with an end opening 54, and flange 56 extending laterally from the edge of the opening 54. The flange 56 is formed with elongated and circular openings 58 and 60. The container 52 is provided with a pair of extension members 62. Each extension member 62 comprises first and second sections 64 and 66 joined at ends thereof at a right angle, and side walls 68 extending along both the first and second sections. The first and second sections 64 and 66 and the side walls 68 define a recess 70. The extension member 62 is connected to the bottom edge of the container 52 through the hinge portion 72.

The part 50 is made of synthetic resin of suitable flexibility, such as polypropylene, nylon, and the like. The hinge portion 72 is therefore flexible enough to permit the extension members 62 to rotate about the hinge axes thereof.

The vehicle panel 73 is formed with a substantially rectangular opening 74. The opening 74 includes a pair of extensions 76 inwardly extending from the opposite edges 77 thereof. The extensions 76 have respective bent ends 78 vertically bent at approximately a right angle with respect to the panel 73.

During the assembly process, the second section 66 of the extension member 62 abuts the extension 76 to be forced toward the flange 56. Thus, the extension member 62 rotates about the hinge portion 72 and finally is positioned as shown in FIG. 8. In this position, the bent end 78 contacts the second section 66 to prevent return motion of the extension member 62.

In this position, the screws 80 engage the panel 73 through the elongated and circular openings 58 and 60. Similar to the foregoing first embodiment, the relatively sharp top or threaded portion of the screw 80 is thus covered by the extensions member 62 so that it may be prevented from contacting the lining or harness (not shown).

Figure 9:
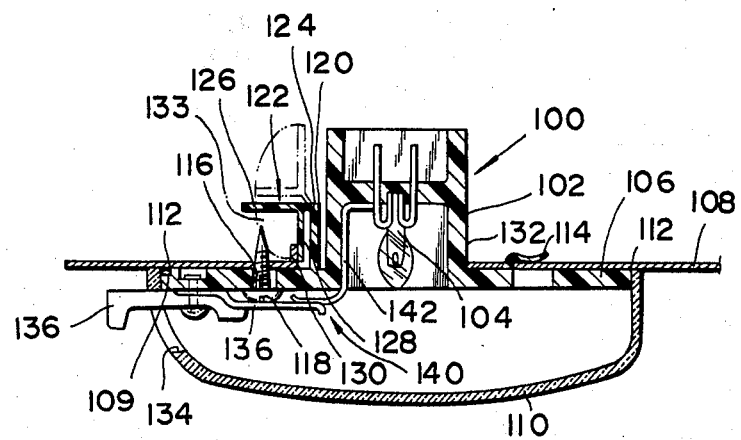
FIG. 9 is a perspective view of the third embodiment of the vehicle part, which is adapted to be used for mounting a room lamp onto a vehicle roof inner panel.
Figure 10:
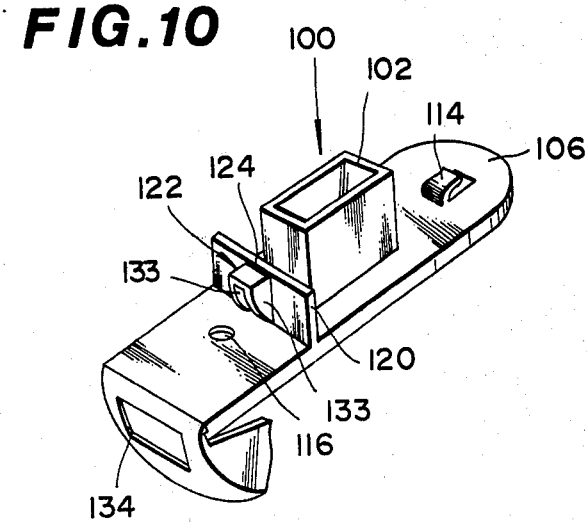
FIG. 10 is a longitudinal section of the vehicle part of FIG. 9 installed on the vehicle roof inner panel.

Referring to FIGS. 9 and 10, there is illustrated the third embodiment of the vehicle part which is intended for installing the room lamp onto the vehicle roof. The vehicle part 100 has a container 102 having a receptacle for the room lamp 104 so that the room lamp is retained within the container. A flange 106 extends from the open end of the container 102 parallel to the vehicle roof inner panel 108. The flange 106 is formed with a circumferentially extending recess 109 on the panel-side surface thereof. A lamp cover 110 made of transparent material is provided with an annular inward-extending projection 112 along its inner peripheral edge so that the projection resiliently engages the recess 109 to sandwich the projection 112 between the flange 106 and the inner panel 108. The flange 106 is further formed with a clip 114 which engages an opening formed in the inner panel 108. On the opposite side of the flange 106 with respect to the container, a screw hole 116 is formed for a screw 118 to secure the flange 106 onto the inner panel 108.

A projection 120 extends vertically from the flange parallel to the walls of the container 102 and near the container. A substantially L-shaped extension 122 is provided at the top of the projection 120 via a flexible thin portion 124 which serves as a hinge to permit the extension to rotate thereabout. The extension 122 comprises first and second plain sections 126 and 128 connected to each other at a right angle. The first section 126 is normally positioned parallel to the walls of the container 102 and the second section 128 is positioned parallel to the inner panel. The first section 126 is long enough to cover the end of screw 118 when the extension is fully rotated about its hinge axis. On the other hand, the second section 128 is long enough to contact the vertically raised edge 130 of the opening 132, which is formed in the inner panel 108 to receive the container 102. A pair of side walls 133 extend along the side edges of the first and second sections 126 and 128 of the extension 122.

As is apparent from FIG. 9, the opening 132 of the inner panel 108 is just large enough to receive the container and the projection 120. The second section 128 of the extension 122 contacts the edge of the opening 132 when the container 102 passes therethrough. Thereafter, the flange 106 is secured to the inner panel 108 with the screw 118. In this position, the extension 122 is fully rotated about the hinge axis and held in the rotated position via engagement of the first section 126 and the raised edge 130. The second section 128 is thus positioned over the end of the screw 118 and side walls 133 cover the sides of the screw.

The lamp cover 108 is also formed with a rectangular opening 134 through which a manual operation switch member 136 for turning on and off the lamp 104 protrudes. The switch member 136 is connected to a movable contact 138 of the switch 140 so that it may be moved by the switch member 136. A stationary contact 142 is connected to the lamp 104 and opposes the movable contact 138 such that it closes the power circuit for the lamp 104 when the switch member 136 is operated to turn on the lamp 104.

In the assembled position, the first section 118 of the extension member 106 is positioned over the end of screw and thus the extension member 106 covers the end of screw 128 so that it prevents the screw from damaging or scratching the head liner or insulation for the electrical wiring of the vehicle.

What is claimed is:

1. An automotive vehicle part to be installed onto a vehicle panel for mounting vehicle equipment such as a room lamp, comprising:
a container having an open-ended chamber for receiving said vehicle equipment;
a flange laterally extending from the periphery of said container and having an opening for receiving a fastener for fixing the flange onto said vehicle panel, said flange constituting a part body in conjunction with said container; and
a fastener cover opposite said fastener for covering at least the end of the fastener, said fastener cover including a flexible hinge, first and second plane sections connected at a right angle, and rotatable about a hinge axis of said hinge between a first position in which said first section is positioned perpendicularly with respect to said panel and said second section is parallel to the flange, and a second position in which said second section is parallel to the flange and extends over said fastener and said first section is aligned perpendicular to said flange.

2. A vehicle part as set forth in claim 1, wherein said fastener cover has side walls extending over said first and second sections.

3. A vehicle part as set forth in claim 2, wherein said part is a room lamp fixture made in part of transparent synthetic resin.

4. A structure for fitting an automotive vehicle part to a vehicle panel comprising:
a vehicle panel having an opening with a vertically-raised edge portion;
a vehicle part including a container;
a flange extending from the periphery of said container parallel to said vehicle panel, said flange having a hole for receiving a fastener by which said vehicle part is fixed to the vehicle panel; and
a fastener cover having first and second plain sections connected to each other at a right angle and a pivot provided at the connecting portion of said first and second sections permitting the first and second sections to rotate about the pivot axis, said first section being adapted to engage with said vertically raised edge of the opening of the vehicle panel when the vehicle part is fixed to the vehicle panel and said second section being adapted to extend over said fastener for covering the latter when said vehicle part is fixed to the vehicle panel.

5. A structure as set forth in claim 4, wherein said fastener cover is integrally formed with said container and a thin connecting section serving as pivot is interpositioned between said container and said fastener cover.

6. A structure as set forth in claim 4 or 5, wherein said vehicle parts is made of synthetic resin such as nylon, polypropylene and the like.

7. A structure as set forth in claim 6, wherein said fastener cover further comprises a side wall extending over said first and second sections so that said side wall covers the side portion of said fastener.

8. An automotive vehicle part to be installed onto a vehicle panel for mounting vehicle equipment such as a room lamp, comprising:
a container having an open-ended chamber for receiving said vehicle equipment;
a flange laterally extending from the periphery of said container and having an opening for receiving a fastener for fixing the flange onto said vehicle panel, said flange constituting a part body in conjunction with said container; and
a fastener cover opposite said fastener for covering at least the end of the fastener, said fastener cover including a flexible hinge, and first and second plane sections, and being rotatable about said hinge between a first position in which said first section is positioned perpendicularly with respect to said panel and said second section is parallel to the flange, and a second position in which said second section is parallel to the flange and extends over said fastener and said first section is aligned perpendicular to said flange.

9. An automotive vehicle part to be installed onto a vehicle panel for mounting vehicle equipment such as a room lamp, comprising:
a container having an open-ended chamber for receiving said vehicle equipment, said container passing an opening formed in said vehicle panel;
a flange laterally extending from the periphery of said container and having an opening for receiving a fastener for fixing the flange onto said vehicle panel, said flange constituting a part body in conjunction with said container; and
a fastener cover opposing said fastener for covering at least the end of the fastener, said fastener cover including a flexible hinge allowing said fastener cover moving between a first and a second position, so that in said first position, said fastener cover is positioned parallel to the circumferential wall of said container so as not to interfere with the installation of the part onto the vehicle, and so that in said second position, said fastener cover extends over said end of said fastener to cover the latter, said fastener cover being adapted to move from said first position to said second position when said container passes said opening of said vehicle panel.

10. A vehicle part as set forth in claim 1 or 8, wherein said fastener cover is integrally formed with said parts body via said hinge.

11. A vehicle part as set forth in claim 10, wherein said vehicle part body, said fastener cover and said hinge are made integrally of a synthetic resin.

12. A vehicle part as set forth in claim 11, wherein said resin is selected from nylon, polypropylene and the like.

* * * * *